United States Patent
Vlemmings et al.

(10) Patent No.: US 6,900,561 B2
(45) Date of Patent: May 31, 2005

(54) ELECTRIC MACHINE, ESPECIALLY A GENERATOR FOR MOTOR VEHICLES

(75) Inventors: Johannes Vlemmings, Weil der Stadt (DE); Manfred Schmitt, Heppenheim (DE); Karsten Mann, Stuttgart (DE); Oliver Kaefer, Murr (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/399,837

(22) PCT Filed: Jun. 20, 2002

(86) PCT No.: PCT/DE02/02250
§ 371 (c)(1),
(2), (4) Date: Nov. 13, 2003

(87) PCT Pub. No.: WO03/019750
PCT Pub. Date: Mar. 6, 2003

(65) Prior Publication Data
US 2004/0066100 A1 Apr. 8, 2004

(30) Foreign Application Priority Data
Aug. 25, 2001 (DE) .......................................... 101 41 693

(51) Int. Cl.[7] .................................................. H02K 9/00
(52) U.S. Cl. ............................................ 310/59; 310/58
(58) Field of Search ............................... 310/52–59, 254, 310/216, 89

(56) References Cited

U.S. PATENT DOCUMENTS 6,577,027 B2 * 6/2003 Hayase et al. ................ 310/59
6,740,993 B2 * 5/2004 Greubel et al. ............... 310/59

FOREIGN PATENT DOCUMENTS

| DE | 196 24 519 | 1/1998 |
|----|------------|--------|
| EP | 0 585 644  | 3/1994 |
| FR | 2 717 638  | 9/1995 |
| NL | 8 204 663  | 7/1984 |

* cited by examiner

Primary Examiner—Thanh Lam
(74) Attorney, Agent, or Firm—Kenyon & Kenyon

(57) ABSTRACT

An electric machine, particularly a generator for motor vehicles, includes a housing and a casing enclosing the housing concentrically, the casing, together with the housing, bounding an annular space that is sealed in a fluid-tight manner and is connected to a coolant outflow and a coolant inflow. To achieve a uniform circumflow of the housing with sufficient cooling capacity, even given low volumetric flow of the coolant, a plurality of axial guide bars are arranged in the annular space, so that the coolant restrictedly flows in an axially wide-strip manner through the annular space within space segments arranged in a row in the circumferential direction, with an opposing flow direction in successive space segments.

17 Claims, 3 Drawing Sheets

ELECTRIC MACHINE, ESPECIALLY A GENERATOR FOR MOTOR VEHICLES

FIELD OF THE INVENTION

The present invention relates to an electric machine, particularly a generator for motor vehicles.

BACKGROUND INFORMATION

In a conventional water-cooled generator for motor vehicles, for example as described in French Patent Application No. 2 717 638, the stator and rotor are accommodated in a pot-shaped housing which, on one hand, is inserted into a pot-shaped encasing in such a manner that an annular space remains between the covering of the pot-shaped encasing and the outer surface of the housing, the annular space being covered in a fluid-tight manner on one side by the bottom of the encasing, and on the other side, by a cover mounted on the pot edge of the encasing and housing. The annular space, on sides turned away from each other, includes an inflow orifice and a discharge orifice which are each enclosed by a connecting piece, projecting radially on the encasing, for a water pipe. The water circulated by a pump in a circulation circuit enters into the annular space through the inflow orifice, circumflows the housing, and exits the annular space again via the discharge orifice. The heat emitted by the generator is absorbed by the cooler water and carried away.

SUMMARY OF THE INVENTION

The electric machine of the present invention may provide that, due to the forced guidance of the coolant by the guide bars, a uniform circumflow of the housing of the electric machine by the coolant is ensured, so that the formation of so-called "hot spots" due to locally insufficient flow velocity of the coolant, for example, due to the development of recirculation bubbles, is prevented. Due to the multitude of guide bars, which at the same time act as cooling vanes, the housing surface available for heat transfer to the coolant increases, so that for an equal cooling capacity, the volumetric flow of the coolant may be reduced by the factor by which the housing surface is increased. Due to the wide-strip axial flow of the coolant, which in each case is turned around at the end sides of the annular space, at the location where the stator of the machine supplies a large input of heat through the metallic housing, the surface for the heat transfer and the flow velocity of the coolant are also great, so that the local cooling capacity is well adapted to the local heat input. The spacings of the guide bars may be dimensioned accordingly for this purpose, as well. Short-circuit losses due to leakage currents over the guide bars are low, since due to the configuration which is favorable for the flow, no large pressure differences result across the small gaps present between the covering and the outer surface of the guide bars.

All in all, in the example machine of the present invention, sufficiently great cooling capacity is furnished for heat dissipation in all space segments, and indeed also for the cases when only a limited volumetric flow of the coolant is available.

According to an example embodiment of the present invention, the guide bars in each space segment form a plurality of parallel flow channels having in each case an inflow end and an outflow end. In the annular space, at each end of the flow channels, coolant collecting sections are formed, extending in the circumferential direction, of which in each case one inflow collecting section extends over the inflow ends and one outflow collecting section extends over the outflow ends of each space segment. At each end of the flow channels, adjoining the discharge collecting section of the one space segment in the circumferential direction is an inlet collecting section of the following space segment, each inlet collecting section being separated from the discharge collecting section of the space segment following in the flow direction. This parallel arrangement of the guide bars in a few, e.g., five, space segments distributed over the periphery of the housing reduces the length of the cooling channel and the resistance to flow.

According to an example embodiment of the present invention, the coolant collecting sections are formed in such a manner that the cross-section of the inlet collecting sections decreases in the flow direction, and the cross-section of the discharge collecting sections increases in the flow direction. Due to this structural formation, the flow velocity in the region of the re-routing of the coolant flow is reduced, and coolant is uniformly distributed to the parallel flow channels, accompanied by uniform flow velocity in the flow channels.

In an example embodiment of the present invention, the coolant collecting sections at the ends of the flow channels are formed in the manner that the guide bars have an equal length, and that within a space segment, successive guide bars in the circumferential direction are shifted axially—e.g., by equal amounts—in the same direction relatively to each other. In so doing, the last guide bar in the space segment is shifted so far that it is brought forward with one bar end to one of two annular bars terminating the annular space at the end face. Due to this structural configuration, the desired decrease and increase of cross-section in the coolant collecting sections and the separation of the inflow collecting sections from the outflow collecting sections in the following space segment may be implemented from the standpoint of production engineering.

According to an example embodiment of the present invention, an inflow channel extending in the axial direction and connected to the coolant inflow, and an outflow channel extending in the circumferential direction and connected to the coolant outflow are formed between the first guide bar of the first space segment in the flow direction and the last guide bar of the last space segment. The inflow and outflow channels are separated from each other by a separating bar extending in the circumferential direction from the front end of the last guide bar in the last space segment up to the first guide bar in the first space segment. In this context, an inflow connecting piece for the coolant inflow mounted on the casing is aligned with its axis in such a manner that the axis forms an obtuse angle with the axial flow direction of the coolant in the inflow channel, and an outflow connecting piece for the coolant outlet mounted on the casing is implemented so that its axis forms an obtuse angle with the more or less tangential flow direction in the outflow channel. Due to this guidance of the inflow and outflow of the coolant, the pressure at the separating bar is reduced on the high-pressure side by the volumetric flow directed away from the separating bar. On the low-pressure side, the pressure at the separating bar is increased by the dynamic pressure of the upwardly discharging coolant. All in all, the result thereby on one hand is a reduction of the total pressure over the separating bar, so that only extremely low leakage losses occur, and on the other hand, a feed and discharge of the coolant which is favorable to the flow, thus helping to reduce the flow resistance.

According to an example embodiment of the present invention, the guide bars, one annular bar and the separating bar, are integrally molded on the housing, which is produced using pressure diecasting or injection molding techniques. Due to the bar formation, which is selected to be favorable from a standpoint of production engineering, the pressure or injection mold is able to be drawn off in the axial direction. The casing, produced separately with integrally molded annular bar, is slid onto the housing thus produced, and the annular space is sealed by two O-rings between the housing and the casing in the region of the annular bars.

DETAILED DESCRIPTION

Figures 1, 2:
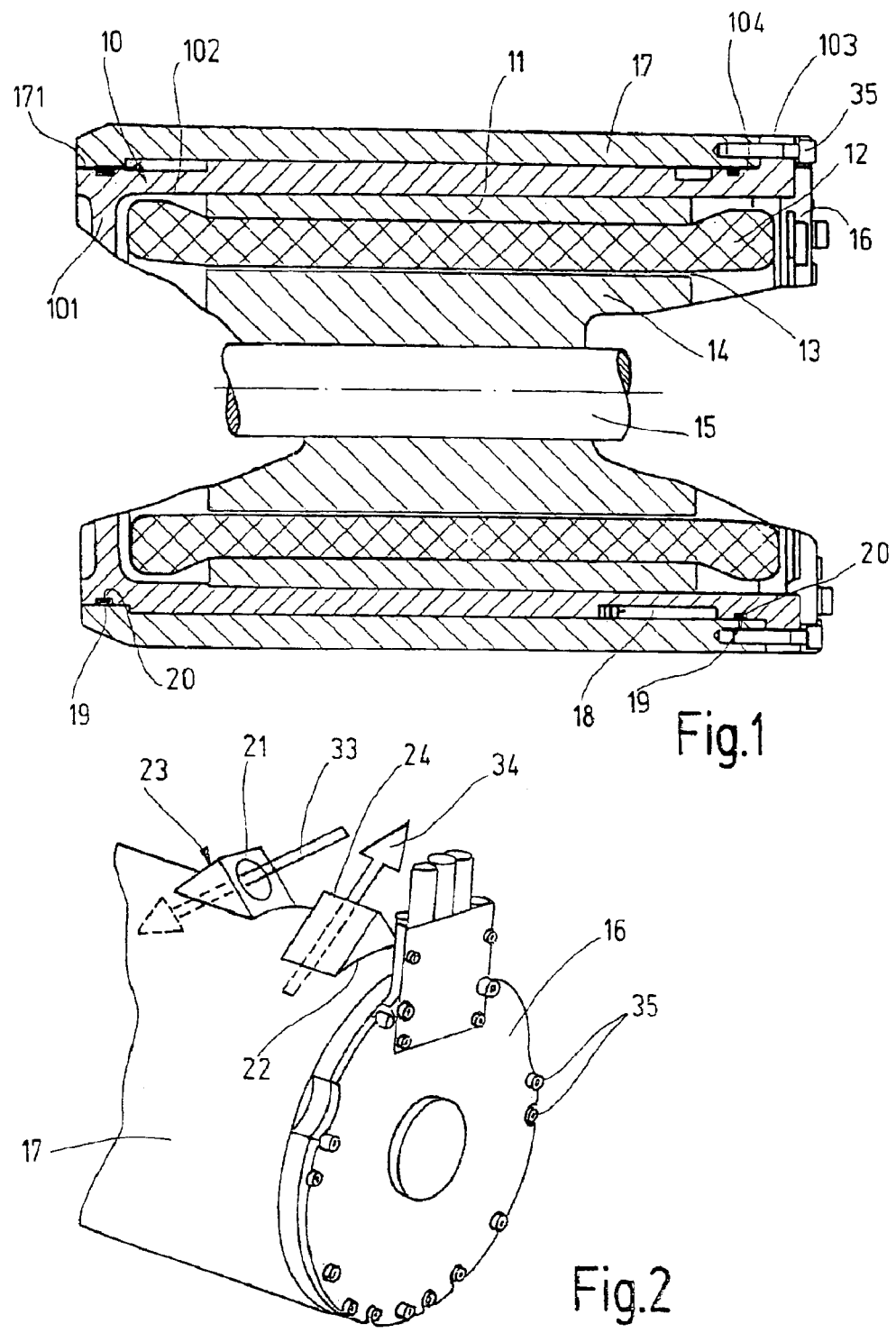
FIG. 1 shows a longitudinal section of a generator for motor vehicles in a cutaway view.
FIG. 2 shows a perspective view of the generator in the direction of arrow II in FIG. 1 in a cutaway view.

The generator, shown in longitudinal section in a cutaway view in FIG. 1, for a motor vehicle as an example embodiment for a general electric machine includes, a stator 11, accommodated in a housing 10, including a stator winding 12, and a rotor 14, enclosed concentrically by stator 11 leaving an air gap 13, which sits in a rotationally fixed manner on a rotor shaft 15 rotationally mounted in housing 10. Housing 10 is pot-shaped, including a base part 101 and a cylindrical part 102. On cylindrical part 102, at the end facing away from base part 101, a radial flange 103 is integrally formed, upon which a bearing cover 16 is secured, sealing housing 10 at the front end. Rotor shaft 15—as not shown in FIG. 1—is in each case accommodated in a pivot bearing integrated in base part 101 and in bearing cover 16.

Directly adjacent to flange 103, an annular bar 104 is integrally molded, projecting radially from the surface of cylindrical part 102. From the other end of cylindrical part 102, a separately manufactured, hollow-cylindrical casing 17 is slid onto housing 10 and, with its front end in the push-in direction, overreaches annular bar 104 on one side, and abuts against flange 103 on the other side. At the rear end of casing 17, a radially inwardly projecting annular bar 171 is integrally formed, whose radial height corresponds to the radial height of annular bar 104 on housing 10. In this manner, an annular space 18 is bounded between casing 17 and cylindrical part 102 of housing 10 and is sealed at the end faces by the two annular bars 104 and 171. In the region of annular bars 104 and 171, in each case a ring seal 19 in the form of an O-ring is disposed between casing 17 and cylindrical part 102 of housing 10, in each instance a ring seal 19 fitting in an annular groove 20 cut into cylindrical part 102 of housing 10. Annular space 18 is connected to a coolant inflow 21 and a coolant outflow 22, which are each assigned an inflow connecting piece 23 and outflow connecting piece 24, respectively, arranged outside on casing 17.

Figure 3:
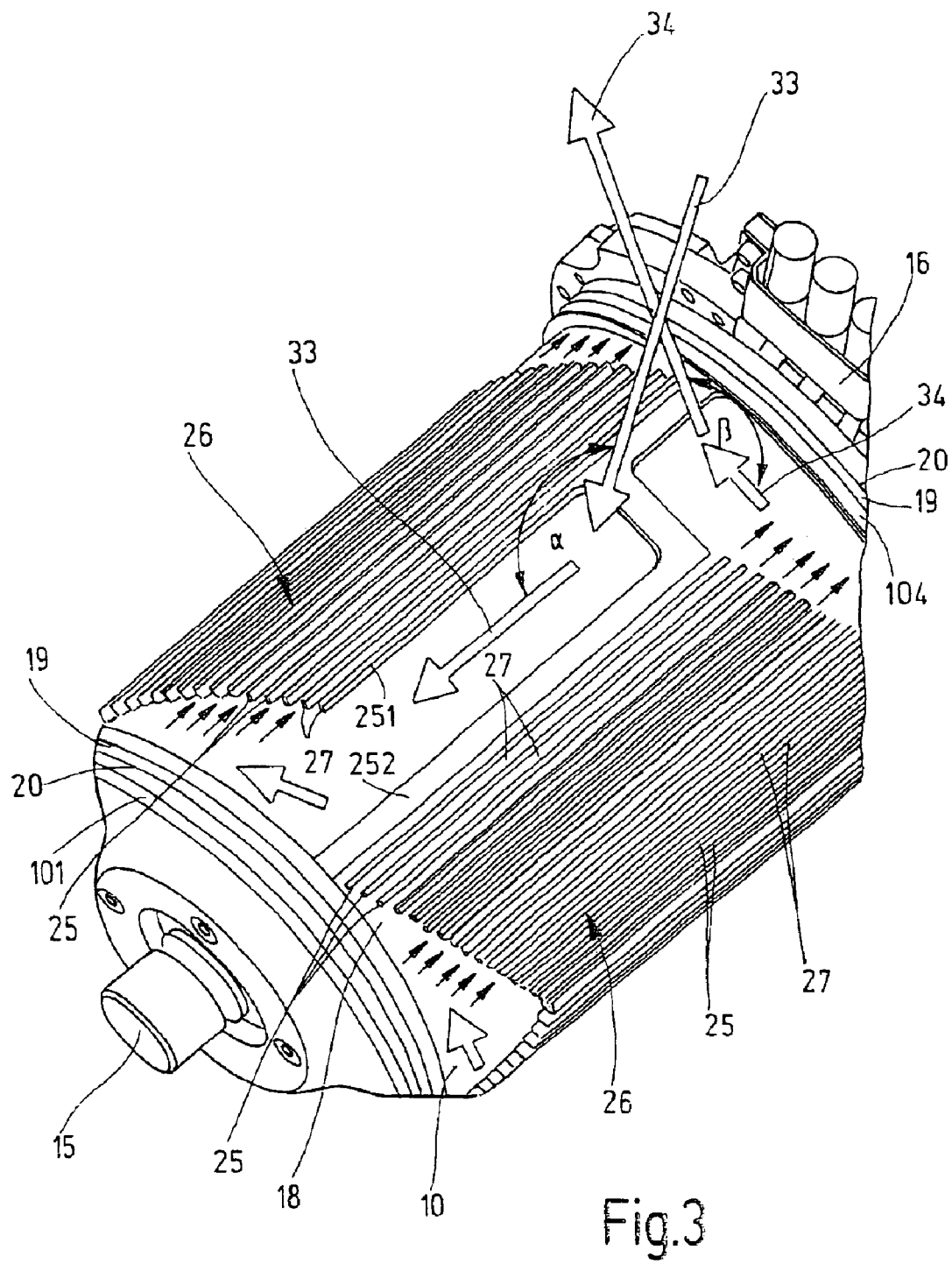
FIG. 3 shows a plan view of the generator in FIG. 1, with the casing drawn off, in a perspective representation.
Figure 4:
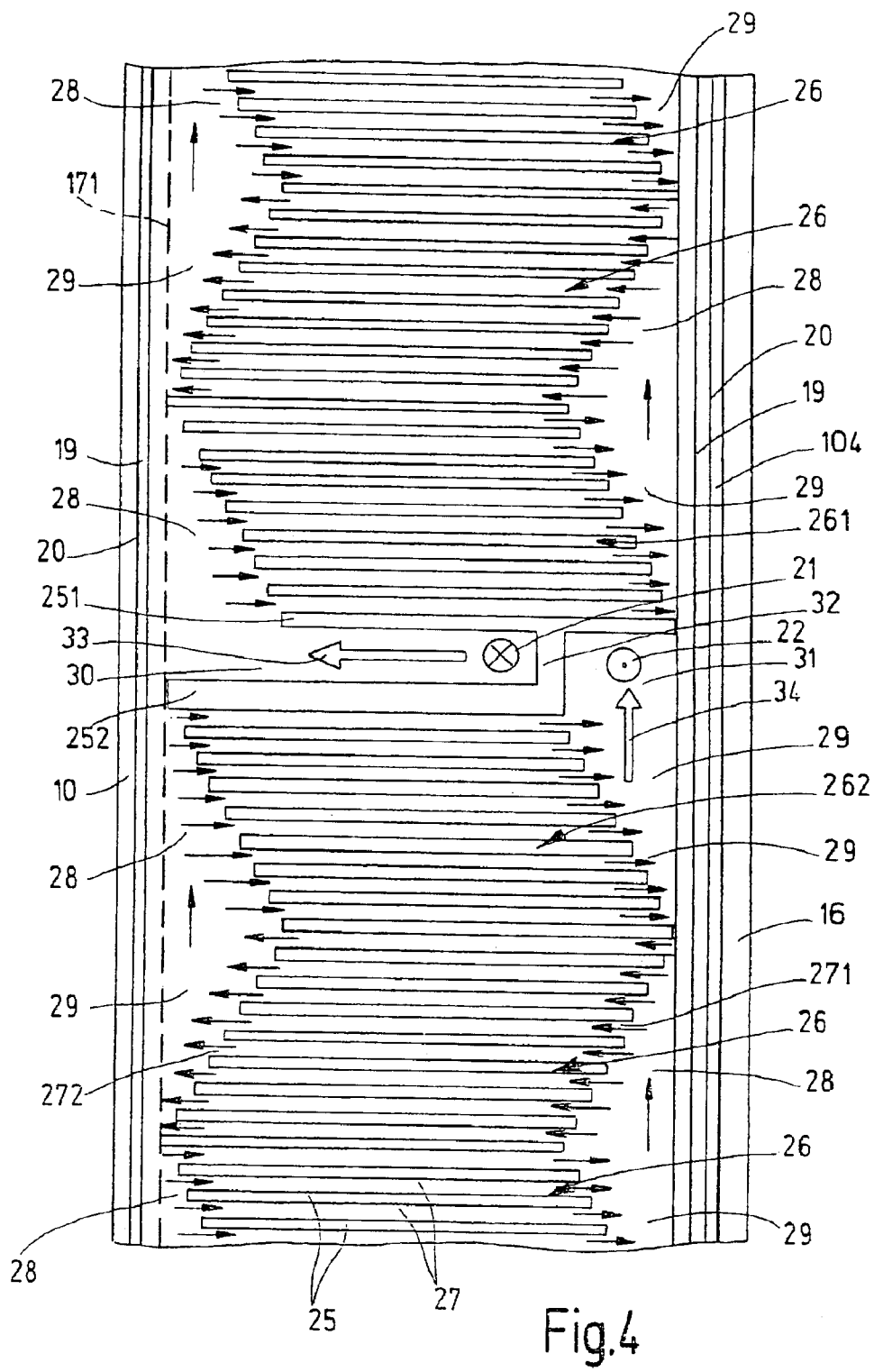
FIG. 4 shows a developed view of the housing of the machine in FIGS. 1–3.

To ensure a uniform circumflow of the housing by the coolant, a restricted guidance of the coolant is implemented in annular space 18 from coolant inflow 21 to coolant outflow 22. In this context, the coolant is restrictedly guided by a plurality of axial guide bars 25, so that it flows in an axially wide-strip manner through annular space 18 within segments of the annular space 18 that are arranged in a row in the circumferential direction, hereinafter known as space segments 26, with opposing flow direction in successive space segments 26. Guide bars 25 have a radial bar height corresponding to the radial width of annular space 18, and in the example embodiment, having the same cross-section and same axial length, are arranged parallel and equidistant to each other, as may be seen in FIGS. 3 and 4. In the example embodiment described here, guide bars 25 are divided over a total of five space segments 26; however, the number of space segments 26 may be selected as desired. In each space segment 26, guide bars 25 form between themselves a plurality of parallel flow channels 27 including an inlet end 271 and a discharge end 272, which have an equal flow cross-section. Guide bars 25 may also be configured and arranged in such a manner, for example, with differently sized distances between them, that flow channels 27 enclosed by them have different flow cross-sections. In this context, the different flow cross-sections are spatially allocated in adaptation to locally different heat input into housing 10. Within each space segment 26, inlet ends 271 lead into an inlet collecting section 28 and discharge ends 272 lead into a discharge collecting section 29, so that at each end of flow channels 27, adjoining in each case a discharge collecting section 29 of the one space segment 26 in the circumferential direction is an inlet collecting section 28 of the following or preceding space segment 26. In inlet collecting sections 28 and discharge collecting sections 29, known altogether as coolant collecting sections, the coolant is distributed to individual flow channels 27 in space segment 26, i.e., the coolant emerging from flow channels 27 is combined and turned around in its flow direction. To avoid short-circuit currents or leakage currents from inlet collecting section 28 of the one space segment 26 to discharge collecting section 29 of space segment 26 following in the flow direction, in each case inlet collecting section 28 of the one space segment 26 is separated from discharge collecting section 29 of space segment 26 following in the flow direction. As FIGS. 3 and 4 show, coolant collecting sections 28, 29 are configured in such a manner that each cross-section of inlet collecting sections 28 decreases in the flow direction, and each cross-section of discharge collecting sections 29 increases in the flow direction. The coolant collecting sections with their cross-sections changing in the flow direction are realized in the manner that parallel guide bars 25 following one another in the circumferential direction within a space segment 26 are shifted axially by an amount, e.g., by the same amount in each case, in the same direction relative to each other. In so doing, the last guide bar 25 in each space segment 26 is shifted so far that with one of its two bar ends, it abuts against one of annular bars 104 and 171, respectively, and consequently separates inlet collection section 28 from discharge collecting section 29 of space segment 26 following in the flow direction.

As may be seen in FIGS. 3 and 4, between first guide bar 251 of first space segment 261 in the flow direction and last guide bar 252 of last space segment 262 in the flow direction, an inflow channel 30 is formed that is connected to coolant inflow 21 and extends in the axial direction, and an outflow channel 31 is formed that is connected to coolant outflow 22 and extends in the circumferential direction. Inflow channel 30 and outflow channel 31 are separated from each other by a separating bar 32 extending in the circumferential direction from the front end of last guide bar 252 in last space segment 262, up to first guide bar 251 in first space segment 261. To reduce the total pressure prevailing at separating bar 32, and consequently to avoid possible leakage losses via the small gap which may form between the bar surface of separating bar 32 and the inner surface of casing 17, or to keep the leakage losses very small, inflow connecting piece 23 is formed in such a manner that its axis forms an obtuse angle α with the axial flow direction of the coolant in inflow channel 30, as is symbolized in FIG. 3 by inflow arrow 33 (see also FIG. 2). On the other hand, outflow channel 31 is formed in such a manner that its axis runs more or less tangentially with respect to housing 10, or in its circumferential direction, and forms an obtuse angle β with the flow direction in outflow channel 31, as is symbolized in FIG. 3 by outflow arrow 34 (see also FIG. 2).

The arrangement of guide bars 25 and flow channels 27 formed between guide bars 25 may be seen very well in the developed view of housing 10 shown in FIG. 4. The flow of the coolant in individual flow channels 27 and in the coolant collecting sections at flow ends 271 and 272 of flow channels 27 is symbolized by the flow arrows drawn in in FIG. 4.

Housing 10, together with parallel guide bars 25, separating bar 32 and annular bar 104, may be produced using the pressure diecasting or injection molding method. Due to the structural configuration of housing 10, the pressure or injection mold is then able to be drawn off axially, and after the generator is completed, separately produced casing 17 may be slid so far onto housing 10 that the front end face of casing 17 in the push-in direction strikes against flange 103 formed on cylindrical part 102 of housing 10. Housing 10 and casing 17 are held together by fastening screws 35 which are screwed through flange 103 into the end face of casing 17. At the same time, screws 35 also affix bearing cover 16 on flange 103 (FIGS. 1 and 2).

What is claimed is:

1. An electric machine, comprising:
   a housing;
   a casing which encloses the housing concentrically and which, together with the housing, bounds an annular space that is sealed in a fluid-tight manner and is connected to a coolant inflow and a coolant outflow; and
   a plurality of axial guide bars arranged in the annular space in such a manner that a coolant restrictedly flows in an axially wide-strip manner within space segments arranged in a row in a circumferential direction, with an opposing flow direction in successive space segments.

2. An electric machine, comprising:
   a housing;
   a casing which encloses the housing concentrically and which, together with the housing, bounds an annular space that is sealed in a fluid-tight manner and is connected to a coolant inflow and a coolant outflow; and
   a plurality of axial guide bars arranged in the annular space in such a manner that a coolant restrictedly flows in an axially wide-strip manner within space segments arranged in a row in a circumferential direction, with an opposing flow direction in successive space segments;
   wherein in each of the space segments, the plurality of axial guide bars form a plurality of parallel flow channels having, in each case, an inlet end and an outlet end, wherein the plurality of axial guide bars are arranged in the annular space so that at each end of the plurality of parallel flow channels, coolant collecting sections are formed extending in the circumferential direction, of which in each case one inlet collecting section extends over the inlet end and one discharge collecting section extends over the outlet end of the plurality of parallel flow channels of each space segment, wherein at each end of the plurality of parallel flow channels, adjoining a discharge collecting section of the space segment in the circumferential direction is an inlet collecting section of a following space segment, and wherein each inlet collecting section is separated from the discharge collecting section of the space segment following in a flow direction.

3. The electric machine of claim 2, wherein the electric machine is a generator for a motor vehicle.

4. The electric machine of claim 2, wherein the plurality of axial guide bars have a radial bar height corresponding to a radial width of the annular space.

5. The electric machine of claim 2, wherein the coolant collecting sections are formed in such a manner that a cross-section of the inlet collecting sections tapers in the flow direction, and a cross-section of the discharge collecting sections increases in the flow direction.

6. The electric machine of claim 5, wherein the cross-sections of the plurality of parallel flow channels formed between the plurality of axial guide bars are of equal size.

7. The electric machine of claim 5, wherein the cross-sections of the plurality of parallel flow channels formed between the plurality of axial guide bars are dimensioned with different size in adaptation to a heat dissipation to be performed differently locally.

8. The electric machine of claim 2, wherein the coolant collecting sections at ends of the plurality of parallel flow channels are formed in a manner that the plurality of axial guide bars have a same length, and within a space segment, successive guide bars in the circumferential direction are shifted axially by equal amounts in a same direction relative to each other.

9. The electric machine of claim 8, wherein a last axial guide bar of the plurality of axial guide bars in the space segment is brought forward with one bar end up to one of two annular bars sealing the annular space at an end face.

10. An electric machine, comprising:
    a housing;
    a casing which encloses the housing concentrically and which, together with the housing, bounds an annular space that is sealed in a fluid-tight manner and is connected to a coolant inflow and a coolant outflow; and
    a plurality of axial guide bars arranged in the annular space in such a manner that a coolant restrictedly flows in an axially wide-strip manner within space segments arranged in a row in a circumferential direction, with an opposing flow direction in successive space segments;
    wherein between a first axial guide bar of the plurality of axial guide bar of a first space segment in a flow direction and a last axial guide bar of the plurality of axial guide bars of a last space segment, an inflow channel is formed extending in an axial direction and connected to the coolant inflow, and an outflow channel is formed extending in the circumferential direction and connected to the coolant outflow, the inflow channels and outflow channels are separated from each other by a separating bar extending in the circumferential direction from the last axial guide bar in the last space segment up to the first axial guide bar in the first space segment.

11. The electric machine of claim 10, wherein the coolant inflow includes an inflow connecting piece mounted on the casing whose axis forms an obtuse angle with an axial flow direction of a coolant in the inflow channel.

12. The electric machine of claim 10, wherein the coolant outflow includes an outflow connecting piece mounted on the casing whose axis forms an obtuse angle with a flow direction in the outflow channel pointing in the circumferential direction of the housing.

13. The electric machine of claim 10, wherein the plurality of axial guide bars, the separating bar and one of two annular bars sealing the annular space at an end face are integrally molded on the housing.

14. The electric machine of claim 13, wherein the casing is produced as a separate component on which another one of the two annular bars is integrally molded, the housing is inserted into the casing, and a ring seal is disposed between the housing and the casing in a region of the two annular bars.

15. The electric machine of claim 14, wherein the ring seal is inserted in an annular groove introduced into the housing.

16. An electric machine, comprising:

a housing;

a casing which encloses the housing concentrically and which, together with the housing, bounds an annular space that is sealed and is connected to a coolant inflow and a coolant outflow; and axial guide bars arranged in the annular space so that a coolant restrictedly flows in an axially wide-strip manner within space segments arranged in a row;

wherein in each of the space segments, the axial guide bars form flow channels each having an inlet end and an outlet end, wherein the axial guide bars are arranged in the annular space so that at each end of the flow channels, coolant collecting sections are formed, of which in each case one inlet collecting section extends over the inlet end and one discharge collecting section extends over the outlet end of the flow channels of each space segment, wherein at each end of the flow channels, adjoining a discharge collecting section of the space segment is an inlet collecting section, and wherein each inlet collecting section is separated from the discharge collecting section of the space segment.

17. An electric machine, comprising:

a housing;

a casing which encloses the housing and which, together with the housing, bounds an annular space that is sealed and is connected to a coolant inflow and a coolant outflow; and axial guide bars are arranged in the annular space so that a coolant restrictedly flows in an axially wide-strip manner within space segments arranged in a row;

wherein between a first axial guide bar of the axial guide bar of a first space segment in a flow direction and a last axial guide bar of the axial guide bars of a last space segment, an inflow channel is formed extending in an axial direction and connected to the coolant inflow, and an outflow channel is formed extending in the circumferential direction and connected to the coolant outflow, the inflow channels and outflow channels are separated from each other by a separating bar.

\* \* \* \* \*